(12) United States Patent
Kobayashi

(10) Patent No.: US 8,649,056 B2
(45) Date of Patent: Feb. 11, 2014

(54) IMAGE PROCESSING APPARATUS, IMAGE PROCESSING METHOD, AND STORAGE MEDIUM

(75) Inventor: Masato Kobayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 190 days.

(21) Appl. No.: 13/365,804

(22) Filed: Feb. 3, 2012

(65) Prior Publication Data

US 2012/0206744 A1    Aug. 16, 2012

(30) Foreign Application Priority Data

Feb. 16, 2011    (JP) .................................. 2011-031263

(51) Int. Cl.
| | | |
|---|---|---|
| G03F 3/08 | (2006.01) | |
| H04N 1/46 | (2006.01) | |
| G06K 15/02 | (2006.01) | |
| H04N 1/60 | (2006.01) | |

(52) U.S. Cl.
CPC .............. *G06K 15/02* (2013.01); *H04N 1/6033* (2013.01)
USPC ............ 358/1.9; 358/3.23; 358/530; 358/518

(58) Field of Classification Search
USPC ........ 358/500, 523, 3.23, 515, 518, 519, 520, 358/530; 382/167
See application file for complete search history.

(56) References Cited

U.S. PATENT DOCUMENTS

| | | | | |
|---|---|---|---|---|
| 6,323,969 | B1 * | 11/2001 | Shimizu et al. ............... | 358/523 |
| 6,552,732 | B1 * | 4/2003 | Davis et al. ................... | 345/619 |
| 6,952,494 | B2 * | 10/2005 | Odagiri et al. ................ | 382/162 |
| 2004/0096104 | A1 * | 5/2004 | Terekhov ....................... | 382/167 |
| 2007/0229868 | A1 * | 10/2007 | Kanai ............................. | 358/1.9 |
| 2011/0249280 | A1 * | 10/2011 | Ito .................................. | 358/1.9 |
| 2011/0316973 | A1 * | 12/2011 | Miller et al. ................... | 348/43 |

FOREIGN PATENT DOCUMENTS

| | | |
|---|---|---|
| JP | 2004-015643 A | 1/2004 |
| JP | 3566350 B | 9/2004 |
| JP | 2006-165864 A | 6/2006 |

OTHER PUBLICATIONS

U.S. Appl. No. 13/365,476 to Katsuyuki Murakami.

\* cited by examiner

*Primary Examiner* — Jerome Grant, II
(74) *Attorney, Agent, or Firm* — Carter, DeLuca, Farrell & Schmidt LLP

(57) ABSTRACT

There is provided an image processing apparatus comprising a selection unit configured to select difference vectors to be used in correction processing of a first color conversion table from difference vectors between reference values and corresponding colorimetric values; a table correction unit configured to correct output values for respective grid points of the first color conversion table using the selected difference vectors; and a table generation unit configured to set conversion results of data which represent grid points of a third color conversion table as output values for the grid points, wherein the conversion results are obtained by performing conversion using a second color conversion table and the first color conversion table which is corrected by the table correction unit.

12 Claims, 15 Drawing Sheets

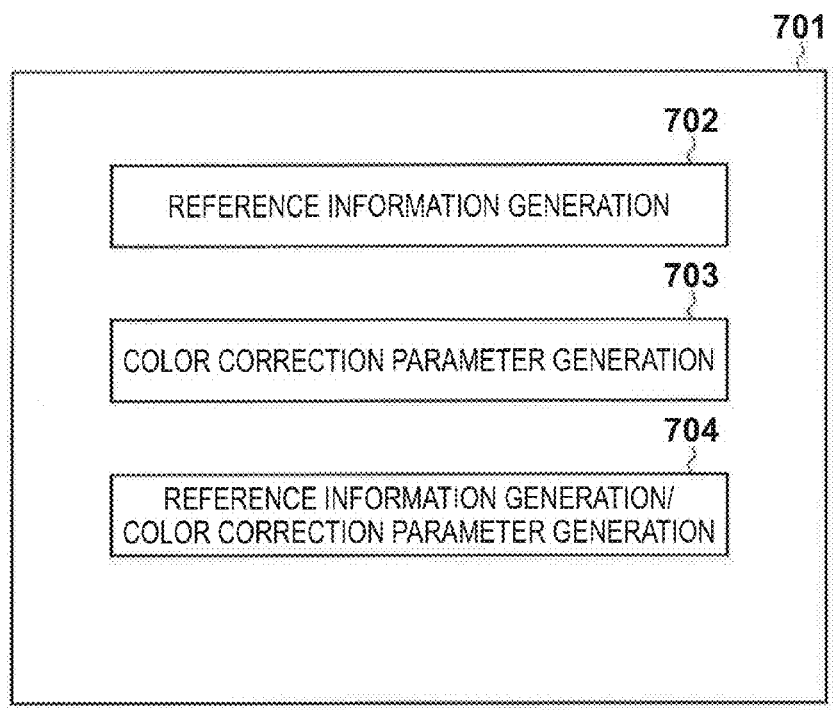
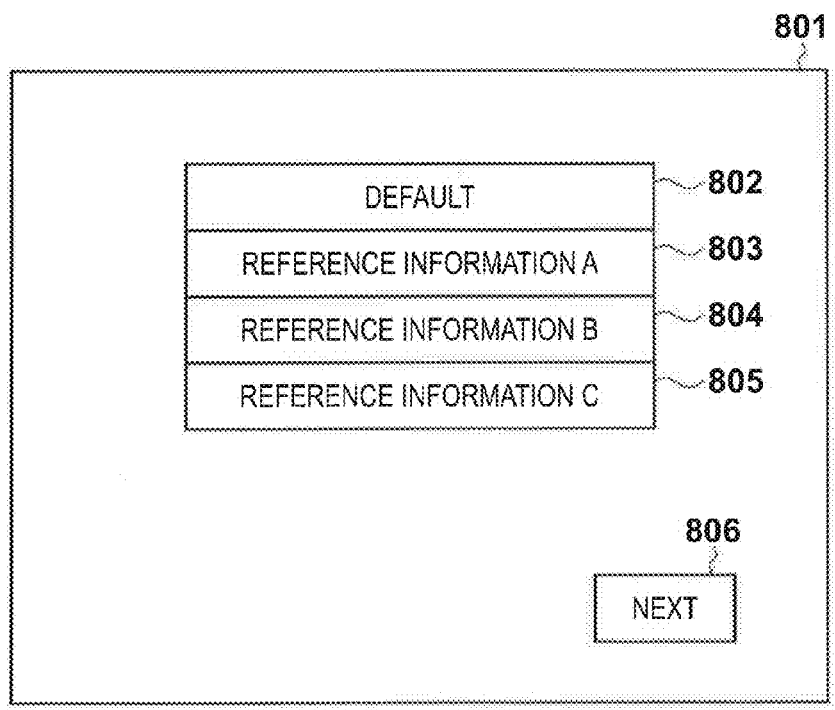

F I G. 10
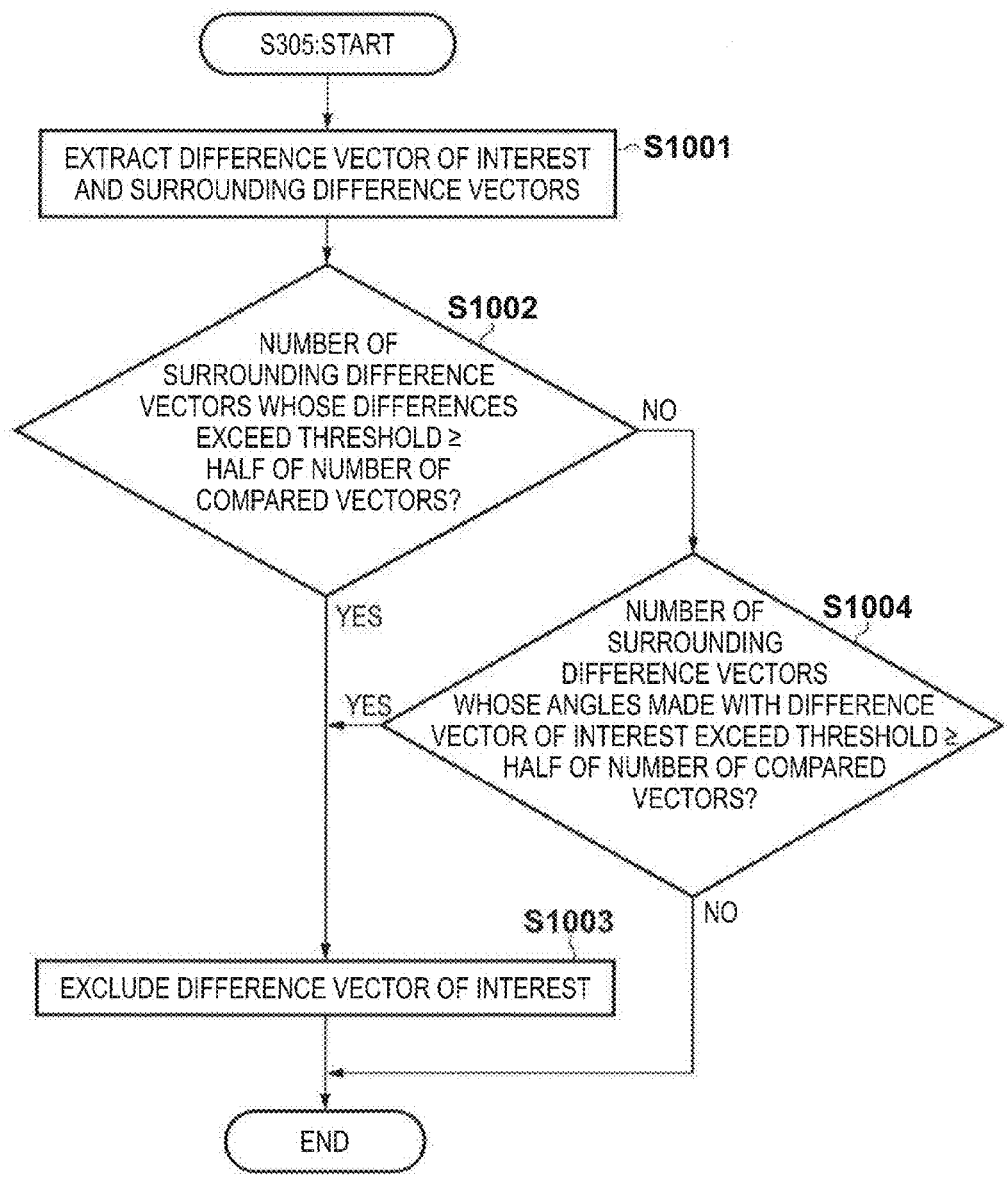

IMAGE PROCESSING APPARATUS, IMAGE PROCESSING METHOD, AND STORAGE MEDIUM

BACKGROUND OF THE INVENTION

1. Field of the Invention

The present invention relates to an image processing apparatus, image processing method, and storage medium used to generate a color conversion table required to correct colors of an image output from an output device.

2. Description of the Related Art

In recent years, performances of printers which form images using an electrophotography system have been improved, and models which realize image quality equivalent to a printing press have appeared. However, such printers suffer problems of larger variation amounts of formed colors than a printing press due to instability unique to the electrophotography system. In order to suppress variation amounts, a conventional electrophotographic printer executes calibrations of unicolors corresponding to cyan (C), magenta (M), yellow (Y), and black (K) toners.

However, execution of only the calibrations of unicolors cannot often sufficiently correct colors since the transfer efficiency, fixing efficiency, and the like of the printer change upon formation of mixed colors. In this case, the transfer efficiency is a non-losing ratio of toners upon transferring toners of respective colors applied on a transfer belt onto a print sheet. For example, when the transfer efficiency of a unicolor (cyan) is 100, that at the time of a mixed color may become 80. Hence, even when colors are matched as unicolors, they may be different at the time of mixed colors. Note that the same applies to the fixing efficiency.

Hence, in recent years, a technique for executing calibrations of mixed colors such as red (R), green (G), blue (B), black (K), and the like has been proposed. For example, a technique for correcting colors of the mixed colors by updating a three-dimensional lookup table (3D-LUT) used to convert data on a device-independent color space (L*a*b*) onto a device-dependent color space (CMYK) is available. With this technique, an image using chart data generated based on mixed colors is output by a printer, and is measured by a scanner or colorimeter. Differences between colorimetric results and target values are calculated in an L*a*b* color space. In this case, the differences are calculated as vectors having magnitudes and directions in the L*a*b* color space. Then, an arbitrary number of differences are extracted in ascending order of distance from a grid point of interest in the L*a*b* color space, and a correction amount is calculated based on the extracted differences. This processing is repeated for all grid points. The reason why the plurality of differences are extracted is to grasp variations between the grid point of interest and surrounding points precisely.

The calculated correction amount has a magnitude and direction in the L*a*b* color space, and indicates a position to which each grid point is to be moved on the L*a*b* color space, that is, an output value for an input L*a*b* value, so as to correct color variations. By correcting all the grid points based on the correction amounts, the 3D-LUT which converts data on the L*a*b* color space onto the CMY color space can be updated, that is, colors of the mixed colors can be corrected.

Also, a technique for executing calibrations of mixed colors using smaller information volumes by generating chart data optimal to a device based on information such as differences between colorimetric results and target values has been proposed (for example, see Japanese Patent Laid-open No. 2004-015643).

However, when a chart image is measured during mixed color calibrations, if a variation amount of a color corresponding to a certain patch is large, differences between colorimetric results and target values on the L*a*b* color space may be large, or a certain patch and neighboring patches may have different directions of changes (differences) between colorimetric results and target values. Such outstanding differences may not precisely reflect variations of colors. When the 3D-LUT is to be corrected during calibrations, grid points are moved with reference to such differences to correct their output values. However, when a certain grid point refers to an outstanding difference, a moving amount of that grid point, that is, a correction amount of an output value may be improper. Also, when moving amounts of only some grid points are large, distortions are generated in color reproduction using the corrected LUT, resulting in a tonality drop sifter color conversion. The same phenomenon is likely to occur when improper chart data is used. In order to suppress any tonality drop caused by the 3D-LUT correction, it is required to generate proper chart data.

SUMMARY OF THE INVENTION

The present invention has been made to solve the aforementioned problems, and provides an image processing apparatus and image processing method, which suppress any tonality drop after correction of a color conversion table at the time of execution of mixed color calibrations.

According to one aspect of the invention, an image processing apparatus comprises; a holding unit configured, to hold a first color conversion table and a second color conversion table, and chart data including a plurality of patch data on a device-independent color space, which are generated using the first color conversion table and the second color conversion table, wherein the first color conversion table specifies color conversion characteristics from the device-independent color space to a device-dependent color space in an output device, and the second color conversion table specifies color conversion characteristics from the device-dependent color space to the device-independent color space; an acquisition unit configured to acquire reference values which are values of the respective patch data in the chart data, and colorimetric values of respective patches on a chart image output by the output device using the chart data; a selection unit configured to select difference vectors to be used in correction processing of the first color conversion table from difference vectors between the reference values and the corresponding colorimetric values; a table correction unit configured to correct output values for respective grid points of the first color conversion table using the selected difference vectors; a table generation unit configured to set conversion results of data which represent grid points of a third color conversion table as output values for the grid points, wherein the conversion results are obtained by performing conversion using the second color conversion table and the first color conversion table which is corrected by the table correction unit, and wherein the third color conversion table is used to correct image data to be output by the output device on the device-dependent color space; and a chart data generation unit configured to generate new chart data by calculating new patch data corresponding to a difference vector which is not selected by the selection unit, using difference vectors or grid points around that difference vector and the first color conversion table corrected by the table correction unit, wherein the acquisition unit, the table correction unit, and the table generation unit are configured to execute processing again using the new chart data generated by the chart data generation unit.

According to another aspect of the invention, an image processing method comprises the steps of: holding a first color conversion table and a second color conversion table, and chart data including a plurality of patch data on a device-independent color space, which are generated using the first color conversion table and the second color conversion table, wherein the first color conversion table specifies color conversion characteristics from the device-independent color space to a device-dependent color space in an output device, and the second color conversion table specifies color conversion characteristics from the device-dependent color space to the device-independent color space; acquiring reference values which are values of the respective patch data in the chart data, and colorimetric values of respective patches on a chart image output by the output device using the chart data; selecting difference vectors to be used in correction processing of the first color conversion table from difference vectors between the reference values and the corresponding colorimetric values; correcting output values for respective grid points of the first color conversion table using the selected difference vectors; setting conversion results of data which represent grid points of a third color conversion table as output values for the grid points, wherein the conversion results are obtained by performing conversion using the second color conversion table and the first color conversion table which is corrected in the correcting step, and wherein the third color conversion table is used to correct image data to be output by the output device on the device-dependent color space; and generating new chart data by calculating new patch data corresponding to a difference vector which is not selected in the selecting step, using difference vectors or grid points around that difference vector and the first color conversion table corrected in the correcting step, wherein the acquiring step, the correcting step, and the setting step are performed again using the new chart data generated in the generating step.

According to still another aspect of the invention, an image processing apparatus comprises: a holding unit configured to hold a first color conversion table and a second color conversion table, and chart data including a plurality of patch data on a device-independent color space, which are generated using the first color conversion table and the second color conversion table, wherein the first color conversion table specifies color conversion characteristics from the device-independent color space to a device-dependent color space in an output device, and the second color conversion table specifies color conversion characteristics from the device-dependent color space to the device-independent color space; an acquisition unit configured to acquire reference values which are values of the respective patch data in the chart data, and colorimetric values of respective patches on a chart image output by the output device using the chart data; a selection unit configured to select difference vectors to be used in correction processing of the first color conversion table from difference vectors between the reference values and the corresponding colorimetric values; a table correction unit configured to correct output values for respective grid points of the first color conversion table using the selected difference vectors; and a table generation unit configured to set conversion results of data which represent grid points of a third color conversion table as output values for the grid points, wherein the conversion results are obtained by performing conversion using the second color conversion table and the first color conversion table which is corrected by the table correction unit; wherein the selection unit is further configured to select the difference vectors to be used in correction processing of the first color conversion table, which remain when difference vectors whose magnitudes exceed a first threshold are excluded from all the difference vectors.

According to the invention, an image processing apparatus and image processing method, which suppress any tonality drop after correction of a color conversion table at the time of execution of mixed color calibrations, are provided.

Further features of the present invention will become apparent from the following description of exemplary embodiments (with reference to the attached drawings).

BRIEF DESCRIPTION OF THE DRAWINGS

FIG. 7 is a view showing a mode selection screen example according to the first embodiment;

FIG. 8 is a view showing a reference information selection screen example according to the first embodiment;

FIG. 10 is a flowchart showing difference vector selection processing according to the second embodiment;

DESCRIPTION OF THE EMBODIMENTS

Embodiments according to the present invention will be described in detail hereinafter with reference to the drawings. Note that the following embodiments do not limit the present invention according to the scope of the claims, and all of combinations of characteristic features described in the embodiments are not always indispensable to the present invention.

First Embodiment

This embodiment will explain a method of generating a color conversion table (third color conversion table) repaired to execute color conversion on a device-dependent color space for image data as an output target, so as to correct colors of an output image by an output device. As a characteristic feature, upon execution of mixed color calibrations, for example, if differences between reference values and colorimetric values for respective patches on a chart image are large, these differences are omitted, and a color conversion table is corrected according to the remaining differences. Furthermore, new chart data is generated according to the excluded differences to repeat calibrations, thus attaining precise correction that suppresses distortions of grid points of the color conversion table, and suppressing any tonality drop.

System Arrangement

Figure 1:
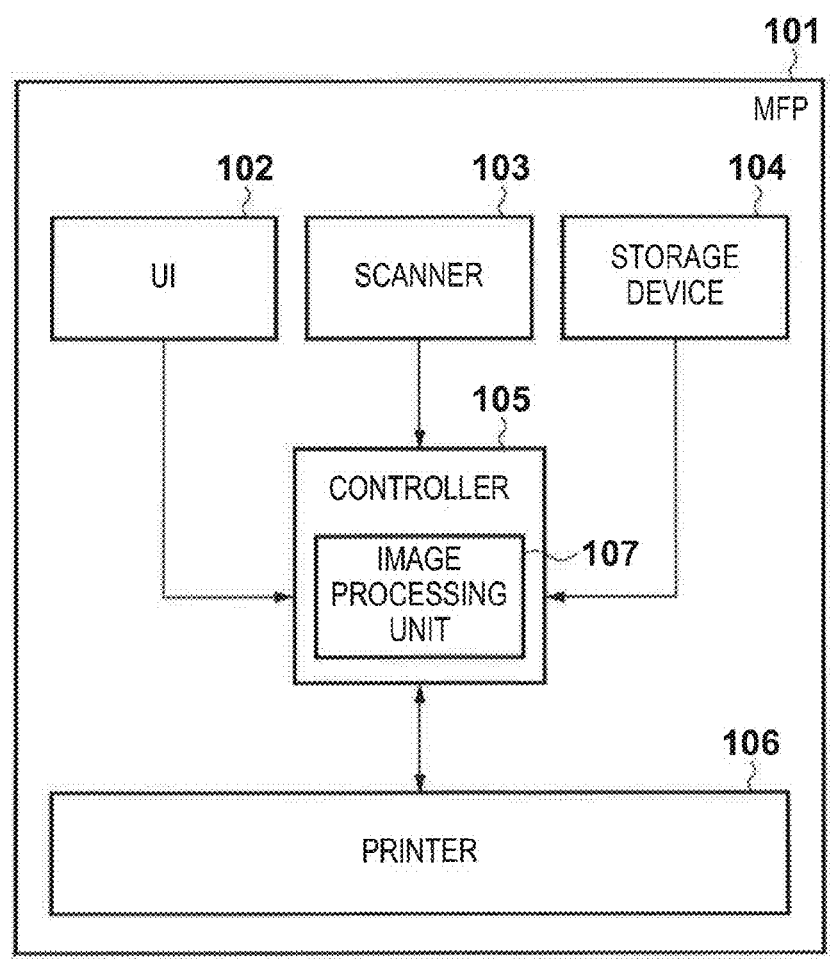
FIG. 1 is a block diagram showing the overall arrangement of an image processing system according to an embodiment of the present invention.

FIG. 1 shows the arrangement of an MFP 101 as an image processing system according to the present invention. As shown in FIG. 1, the MFP 101 of this embodiment comprises a UI 102, scanner 103, storage device 104, controller 105, and printer 106. The controller 105 includes an image processing unit 107.

The UI 102 is an interface to receive inputs from the user, and is a display device which shows instructions to the user and states of the MFP 101. The scanner 103 includes an auto document feeder (ADF). The scanner 103 irradiates a document image of one or a bundle of documents with light coming from a light source (not shown), forms a document reflected image on a solid-state image sensing element such as a CCD sensor via a lens, and obtains a raster-patterned image scanning signal from the solid-state image sensing element as image data. The storage device 104 saves chart data, color conversion tables, and the like used at the time of calibrations in addition to data processed by the controller 105 and those received by the controller 105. The printer 106 connected to the controller 105 is an output device, which forms output data on a paper sheet using a total of four color toners which are black (K) and three colors including cyan (C), magenta (M), and yellow (Y). The printer 106 forms output data by feeding a print sheet, and then exhausts the sheet. The image processing unit 107 applies image processing to, for example, an image scanned by the scanner 103.

Image Processing Overview

Figure 14:
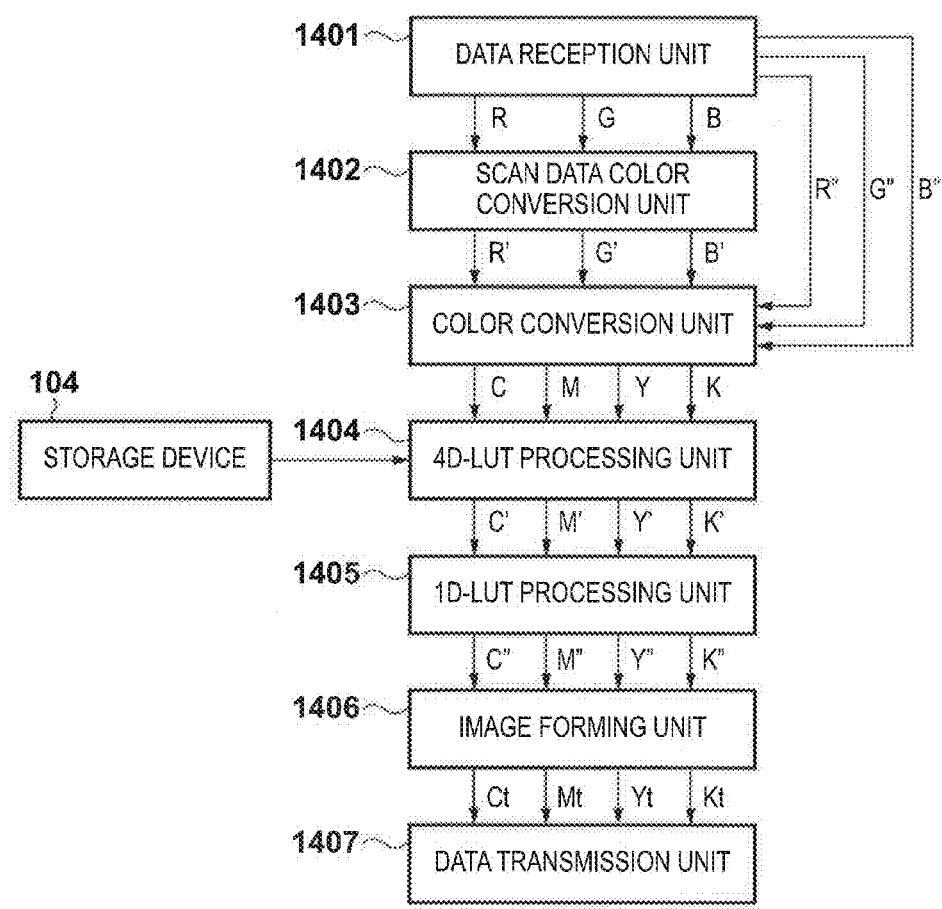
FIG. 14 is a diagram showing an overview of image processing according to the first embodiment.

FIG. 14 shows the sequence of image processing in the image processing unit 107. The image processing unit 107 checks data received by a data reception unit 1401. When the received data is scan data (RGB) received from the scanner 103, the image processing unit 107 transmits that scan data to a scan data color conversion unit 1402. On the other hand, when the received data is not scan data, it is raster data. Hence, the image processing unit 107 transmits that raster data (R"G"B") to a color conversion unit 1403. The scan data color conversion unit 1402 executes color conversion for the scan data (RGB data) to convert it into common RGB data (R'G'B'). In this case, the common RGB data is data defined on an RGB color space that does not depend on any device, and can be converted into data on a device-independent color space such as L*a*b* by calculations.

The color conversion unit 1403 executes color conversion for the data (R'G'B' or R"G"B") sent from the scan data color conversion unit 1402 or data reception unit 1401. The received data on the RGB color space is converted by this conversion into CMYK data on a CMYK color space which depends on the output device (printer 106). Next, a 4D-LUT processing unit 1404 corrects colors of mixed colors using CMYK data by executing correction processing using an LUT indicating four-dimensional color conversion (CMYK→CMYK) (to be referred to as a 4D-LUT hereinafter) on the device-dependent color space. Calibration processing in this embodiment features generation of this 4D-LUT with high precision, and generation of chart data used in generation of this 4D-LUT. The 4D-LUT processing unit 1404 exchanges 3D-LUT data, chart data, and the like with the storage device 104, and details of this processing will be described later.

After the colors of the mixed colors are corrected using the 4D-LUT, a 1D-LUT processing unit 1405 corrects tone characteristics of unicolors C, M, Y, and K using one-dimensional LUTs (to be referred to as 1D-LUTs hereinafter). Since the 1D-LUT generation method can use a known method, a description thereof will not be given. After the tone correction using the 1D-LUTs, an image forming unit 1406 executes image forming processing to generate binary CMYK data (CfMtYtKt). Finally, a data transmission unit 1407 transmits the binary CMYK data (CtMtYtKt) to the printer 106.

Reference Information Generation Processing

In this embodiment, prior to execution of the calibrations, reference information indicating the color conversion characteristics of the printer 106 and chart data (reference chart data) corresponding to the reference information are generated in advance, and are stored in the storage device 104. A plurality of pieces of reference information can be set, and one of them is selected by the user as a correction target in the calibrations.

Figure 9:
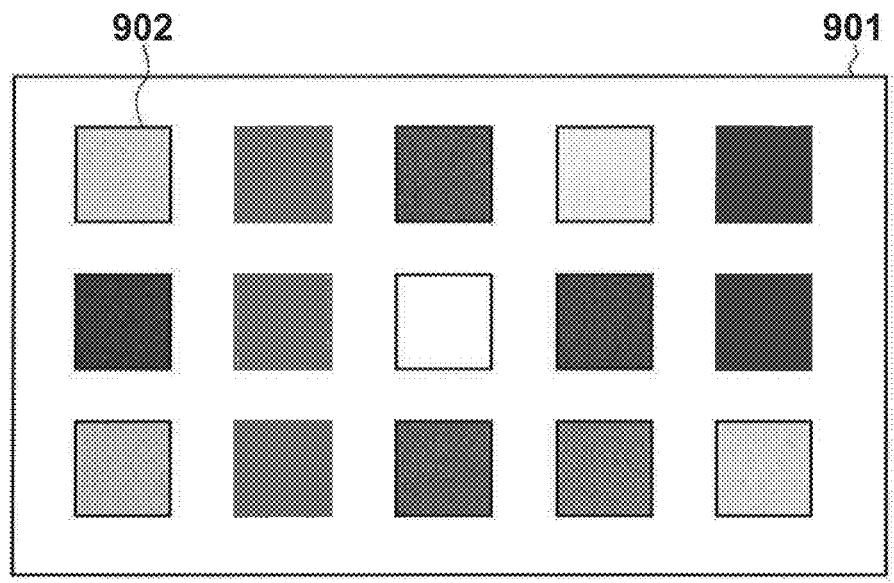
FIG. 9 is a view showing a chart image example according to the first embodiment.
Figure 15:
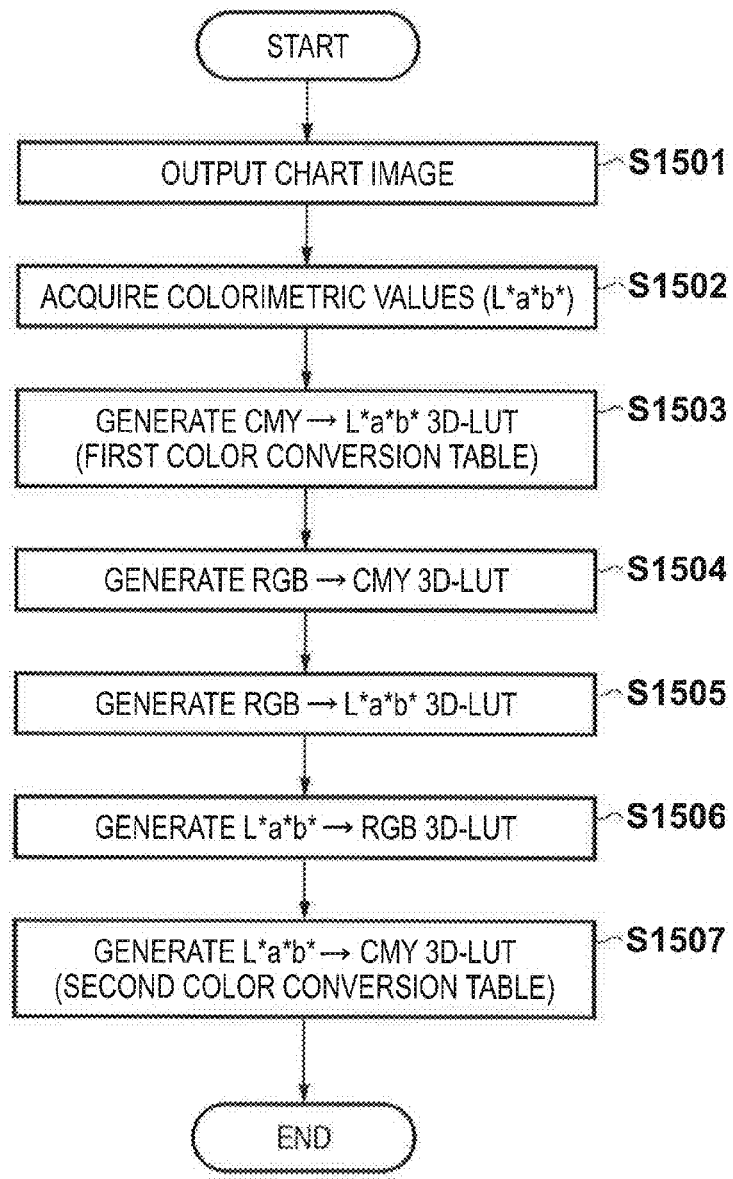
FIG. 15 is a flowchart showing reference information generation processing according to the first embodiment.

The reference information generation method will be described first with reference to the flowchart shown in FIG. 15. In step S1501, a chart image based on chart data, which is held in advance in the storage device 104 and is used to generate reference information, is output by the printer 106. The chart data in this case has been generated by changing CMY tones at uniform intervals, and includes 8×8×8=512 data when, for example, all tones are divided into 8. FIG. 9 shows an example of a chart image based on this chart data. In FIG. 9, each data of she chart data is output as a rectangle 902 having a given size on a paper sheet 901, and this rectangle 902 is called a patch. When the chart data includes 512 patch data, 512 patches are formed on a chart image.

In step S1502, L*a*b* values are acquired from photometric values of the chart image. Next, in step S1503, using the chart data used to generate the reference information and the L*a*b* values, a 3D-LUT (first color conversion table) from a device-dependent color space to a device-independent color space, that is, CMY→L*a*b*, is generated. That is, the CMY→L*a*b* 3D-LUT is generated according to a conditions of the printer 106 at the output timing of the chart image.

Subsequently, a 3D-LUT (second color conversion table) from a device-independent color space to a device-dependent color space, that is, L*a*b*→CMY is generated. In step S1504, using RGB uniform data and CMY values of vertices of the RGB color space, an RGB→CMY LUT Is generated by given interpolation calculations. The RGB color space has vertices R, G, B, C, M, Y, Bk, and W. For example, a CMY value corresponding a vertex R is (C, M, Y)=(0, 255, 255). Since corresponding CMY values depend on the characteristics of the printer 106, they do not always assume the same values. However, for example, combinations of highest saturation are selected for R, G, B, C, M, and Y, and a combination of lowest lightness are selected for Bk. Note that combinations of CMY values are not particularly limited. In step S1505, an RGB→L*a*b* 3D-LUT is calculated using the RGB→CMY and CMY→L*a*b* 3D-LUTs. In step S1506, an L*a*b*→RGB 3D-LUT is generated by making back calculations based on a known calculation method from the RGB→L*a*b* 3D-LUT. Then, in step S1507, an L*a*b*→CMY 3D-LUT (second color conversion table) is generated using the L*a*.b*→RGB and RGB→CMY 3D-LUTs.

The first and second color conversion tables generated as the reference information, that is, the two CMY→L*a*b* and L*a*b*→CMY 3D-LUTs are held in the storage device 104 as information indicating the color conversion characteristics of the printer 106 at their generation timing. Then, this reference information (3D-LUTs) is used as a correction target upon generation of a 4D-LUT (to be described later).

Reference Chart Data Generation Processing

In this embodiment, reference chart data corresponding to the first and second color conversion tables, that is, the two CMY→L*a*b* and L*a*b*→CMY 3D-LUTs, which are generated as the reference information, as described above, are generated and are stored in the storage device 104. L*a*b* values in the reference chart data are referred to as reference values at the time of a first calibration.

Figure 16:
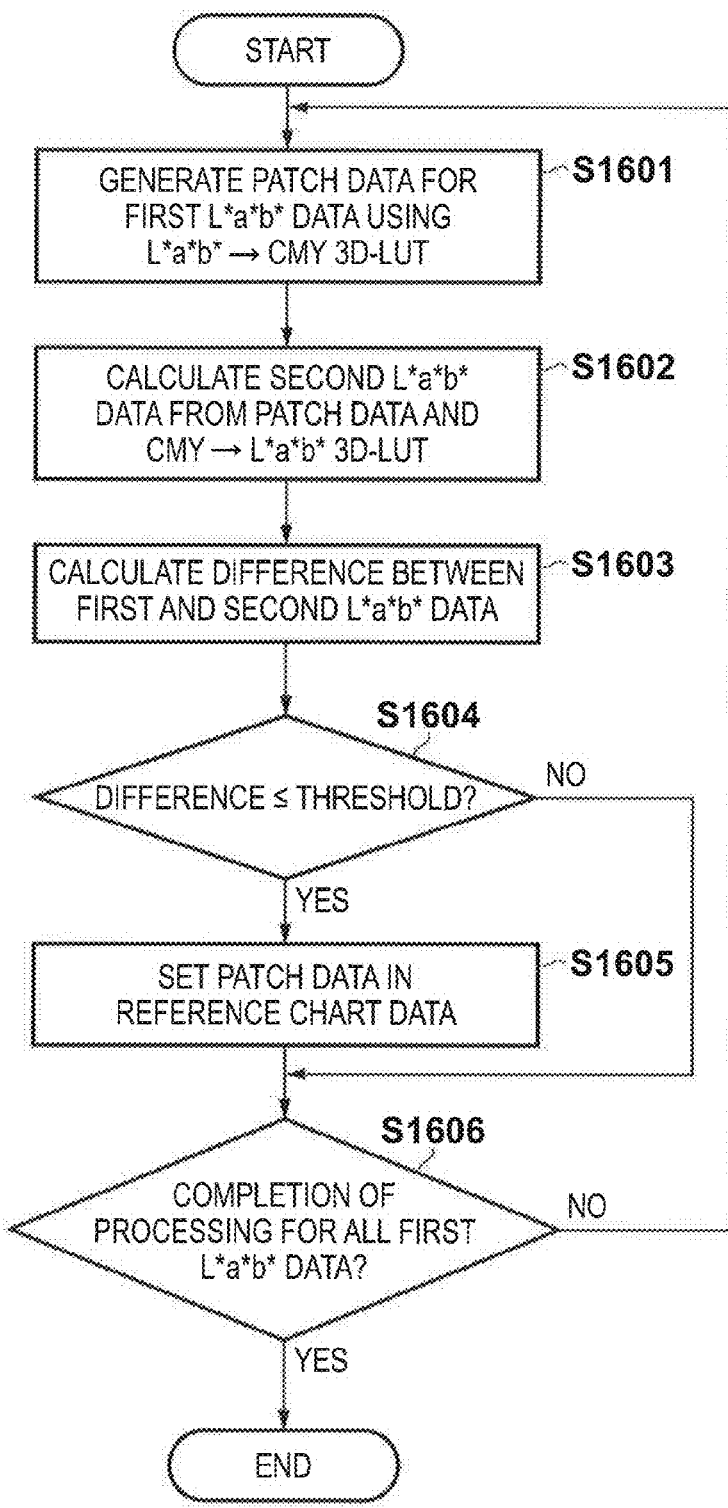
FIG. 16 is a flowchart showing reference chart data generation processing according to the first embodiment.

The reference chart data generation method will be described below with reference to the flowchart shown in FIG. 16. In step S1601, patch data is generated, in correspondence with first L*a*b* data, which is arbitrarily defined on the L*a*b* color space, using the L*a*b*→CMY 3D-LUT as the reference information. The first L*a*b* data is one of an arbitrary number of data defined from huge combinations of L*a*b* data, and is one data in uniform data obtained by, for example, dividing the L*a*b* color space at given intervals.

In steps S1602 to S1604, infra-gamut determination processing is executed using the first L*a*b* data processed in step S1601 and corresponding patch data, and the CMY→L*a*b* 3D-LUT as the reference information. Note that the intra-gamut determination processing is to determine whether or not the first L*a*b* data processed in step S1601, that is, the first L*a*b* data corresponding to patch data falls within a color reproduction range (gamut) of the printer 106 as a calibration target. In this case, some first L*a*b* data fail outside the gamut of the printer 106 and are likely to indicate colors which cannot be output by the printer 106. Since such L*a*b* data falling outside the gamut cannot be used in calibrations, the infra-gamut determination processing is executed in steps S1602 to S1604, so as to exclude data falling outside the gamut in this embodiment.

The intra-gamut determination processing of this embodiment will be described below. Note that the gamut determination method is not limited to this example, and any other methods may be used as long as whether or not the first L*a*b* data falls within the gamut of the printer 106 can be determined. In step S1602, second L*a*b* data is calculated for CMY patch data using the CMY→L*a*b* 3D-LUT.

Of the first L*a*b* data arbitrarily generated on the L*a*b* color space, data falling outside the gamut of the printer 106 are rounded to values falling within the gamut when they are converted into CMY values using the L*a*b*→CMY 3D-LUT in step S1601. Therefore, when the CMY value (patch data), which is rounded to fall within the gamut, is converted into the second L*a*b* data using the CMY→L*a*b* 3D-LUT, a large difference is generated between the second L*a*b* data after conversion and the first L*a*b* data before conversion. In this embodiment, as the intra-gamut determination, a difference between the first and second L*a*b* data is calculated in step S1603, and it is determined in step S1604 whether or not the difference falls within a predetermined threshold range. That is, if the difference falls within the threshold range, it is determined that the first L*a*b* data falls within the gamut of the printer 106, and patch data corresponding to the first L*a*b* data is set in reference chart data in step S1605. Then, the process advances to step S1606. On the other hand, if the difference falls outside the threshold range, the process jumps to step S1606 without setting patch data in the reference chart data.

It is determined in step S1606 whether or not the processes in steps S1601 to S1605 are complete for all the first L*a*b* data which are arbitrarily set on the L*a*b* color space. If the processing is complete for all the first L*a*b* data, the reference chart data generation processing ends. On the other hand, if the first L*a*b* data to be processed still remain, the process returns to step S1601 to repeat the processing for the first L*a*b* data to be processed.

In this way, the reference chart data is generated by excluding L*a*b* data railing outside the gamut of the printer 106 from the arbitrarily generated L*a*b* data, that is, extracting only L*a*b* data falling within the gamut, and using only the extracted L*a*b* data. Since this extraction uses the reference information (CMY→L*a*b* and L*a*b*→CMY 3D-LUTs), a reference chart according to the reference information is generated. In this way, by limiting the number of L*a*b* data by executing the intra-gamut determination processing of the printer 106, the number of patches in the reference chart image can be reduced. The generated reference chart data is stored in the storage device 104 in association with the reference information used in its generation.

Calibration Processing

Calibration processing of this embodiment will be described below. The calibration processing of this embodiment is processing for generating a 4D-LUT with high precision by the controller 105. An overview of the calibration processing will be described first with reference to the flowchart shown in FIG. 2.

In step S201, the controller 105 receives a calibration instruction from the UI 102. In step S202, in order to execute a first calibration, the controller 105 loads the reference chart data, which is held in advance in the storage device 104, controls the image processing unit 107 to process that data, and transmits the processed data to the printer 106, thus outputting a chart image. As the reference chart data for the first calibration, reference chart data corresponding to the reference information set as a correction target by the user of a plurality of reference chart data held in the storage device 104 is selected and loaded.

In step S203, using the scanner 103, the controller 105 executes colorimetry of the output chart image, thus obtaining colorimetric values. In step S204, the controller 105 corrects, using the colorimetric values, the 3D-LUT which is held as the reference information in the storage device 104, and indicates three-dimensional color conversion (L*a*b*→CMY) from the device-independent color space to the device-dependent color space. This 3D-LUT correction processing is executed by the image processing unit 107, and details of this processing will be described later. Then, in step S205, the controller 105 generates a 4D-LUT used in the 4D-LUT processing unit 1404 of the image processing unit 107 based on the corrected 3D-LUT. This 4D-LUT generation processing is executed by the image processing unit 107, and details of this processing will be described later.

Upon completion of generation of the 4D-LUT, the controller 105 executes calibration end determination processing. That is, the controller 105 determines in step S206 whether or not the user sets a tonality importance mode to be ON. The processing ends if the tonality importance mode is not set to be ON (NO in step S206). If the tonality importance mode is set to be ON (YES in step S206), the controller 105 determines in step S207 whether or not there are difference vectors which are excluded from processing targets since their magnitudes exceed a threshold in the 3D-LUT correction processing in step S204. In this case, a difference vector is calculated as a difference between an L*a*b* value (reference value) in the chart data and that (colorimetric value) obtained by measuring the L*a*b* value of the chart data, and details of this vector will be described later. If there is no excluded difference vector, the calibration processing ends. If there are excluded difference vectors, the process advances to step S208 to generate new chart data using the excluded difference vectors. Then, the process returns to step S202 to issue an output instruction of a chart image based on the new chart data, thereby repeating the second or subsequent calibration processing. Note that details of the new chart data generation processing in step S208 will be described later.

3D-LUT Correction Processing (S204)

Figure 3:
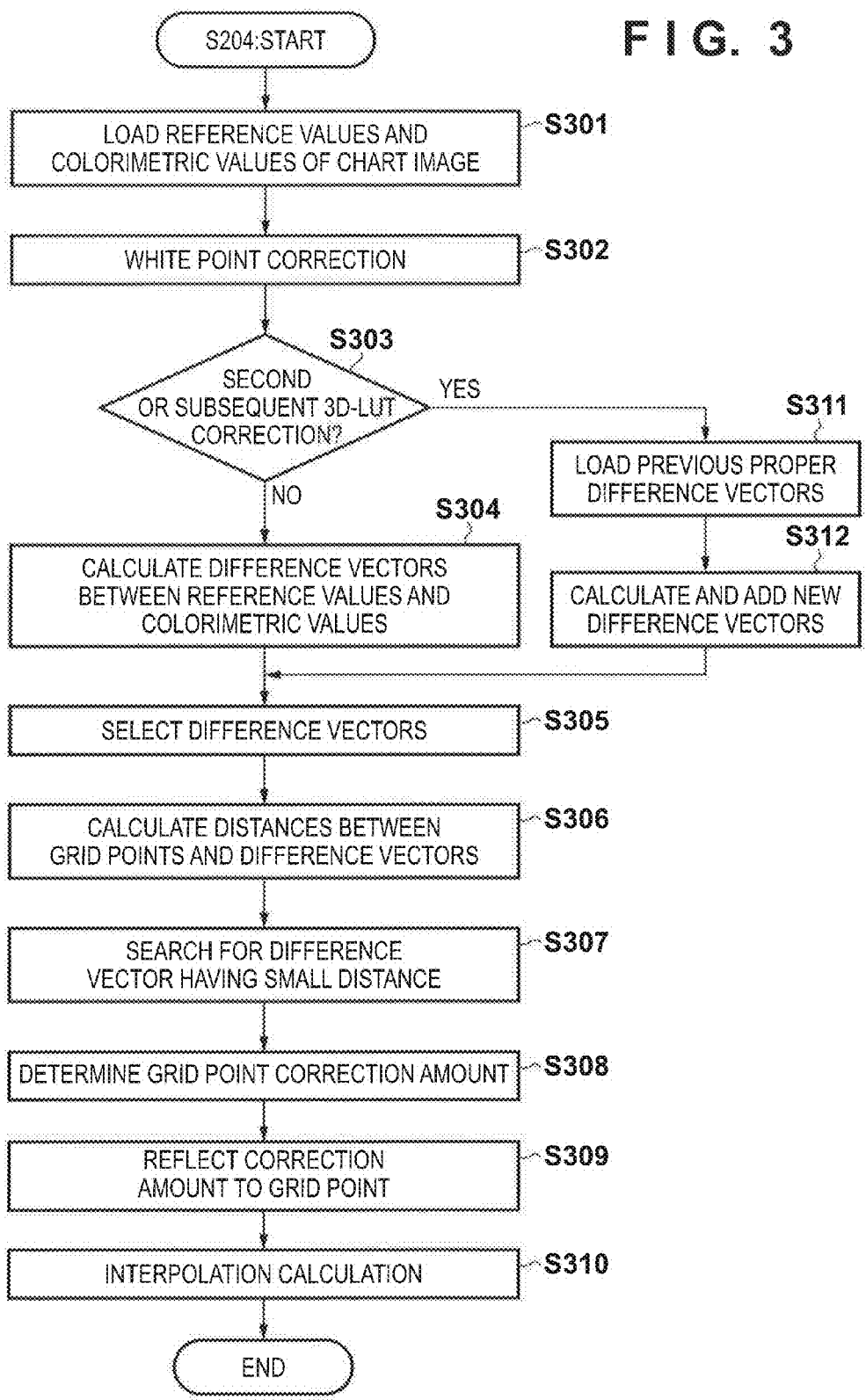
FIG. 3 is a flowchart showing correction processing of an L*a*b*→CMY 3D-LUT according to the first embodiment.

The L*a*b*→CMY 3D-LUT correction processing in step S204 will be described in detail below with reference to the flowchart shown in FIG. 3. Note that the L*a*b*→CMY 3D-LUT as a correction target is held in advance in the storage device 104 as the reference information.

In step S301, the image processing unit 107 loads reference values and colorimetric values corresponding to the chart image output in step S202. In this case, since the reference values are L*a*b* values of chart data corresponding to the chart image, L*a*b* values of the reference chart data are loaded from the storage device 104 at, for example, the first calibration timing. At the second or subsequent calibration timing, L*a*b* values of new chart data generated in step S208 are loaded. The colorimetric values are L*a*b* values obtained by scanning the chart image using the scanner 103.

In step S302, the image processing unit 107 applies white point correction to ail of the reference values and colorimetric values. In this case, the white point correction is to correct a white difference due to different paper types or the like, and can absorb a color (colorimetric value) difference due to different paper sheets. More specifically, a ratio of a colorimetric value of paper white (a white portion where no toners are applied on a print sheet) and an arbitrarily set white reference value (for example, L=100, a=0, and b=0 as white under a standard light source D50 specified by the CIE) is calculated. Then, the white point correction is attained by multiplying the colorimetric values and reference values by that ratio.

The image processing unit 107 determines in step S303 whether or not the number of 3D-LUT correction times is two or more, that is, the second or subsequent calibration is to be executed. If the number of 3D-LUT correction times is 1 (NO in step S303), the image processing unit 107 calculates difference vectors indicating differences between all the reference values after the white point correction and the corresponding colorimetric values after the white point correction in step S304, and the process then advances to step S305. On the other hand, if the number of 3D-LUT correction times is two or more (YES in step S303), the process advances to step S311 to load previously selected difference vectors (previous step S305; to be described in detail later). The previously selected difference vectors are held in, for example, a memory (not shown) in the controller 105. In step S312, the image processing unit 107 calculates difference vectors for new reference values, which are different from those in the previous processing of those loaded in step S301, and corresponding colorimetric values, and adds them as new difference vectors to those loaded in step S311. After that, the process advances to step S305.

In step S305, the image processing unit 107 executes selection processing of the difference vectors. This selection processing is executed by determining, for each difference vector, a vector whose magnitude exceeds an arbitrary threshold as an outstanding difference vector from all the vectors, and excluding it from those to be referred to at the time of correction amount calculation processing (S306 to S308; to be described later). For example, if an inter-grid point distance in the L*a*b* space in the L*a*b*→CMY 3D-LUT is used as the threshold, if a difference vector having a magnitude which exceeds the inter-grid point distance is found, an exclusion flag is set, and that vector is excluded from calculation targets at the time of correction amount calculations. In this way, difference vectors, corresponding to colors whose tonality is difficult to maintain, and which are generated due to device differences, individual variations, and improper chart data, can be excluded from calculation targets, thus executing the calibration processing. The selection result in step S305 is held in, for example, a memory (not shown) in the controller 105.

Next, the image processing unit 107 executes, using the selected difference vectors, table correction processing for correcting output values of grid points of the 3D-LUT in steps S306 to S310. The image processing unit 107 calculates distances between grid point data of the L*a*b*→CMY 3D-LUT and the reference values of the difference vectors after the white point correction in step S306, and searches for and extracts difference vectors whose distances are equal to or smaller than a predetermined threshold (fourth threshold) in step S307. This extraction is attained by searching for difference vectors within a sphere, which has a grid point of interest as the center, and the inter-grid point distance as a radius. More specifically, difference vectors having distances between the grid point of interest and their reference values, which are smaller than the radius, are extracted in turn. If no difference vector is found in the sphere, the radius is doubled to search a non-searched sphere. For example, if the threshold is set to be a distance between four grid points, a search is repeated three times, and if no difference vector is found, the processing ends.

In step S308, the image processing unit 107 determines a correction amount for each grid point data of the L*a*b*→CMY 3D-LUT based on the extracted difference vectors. If one difference vector is extracted, that difference vector is used intact as a correction amount. On the other hand, a plurality of difference vectors may be extracted, and include those having distances closer to and farther away from the qrid point data. In this embodiment, in order to strengthen influences of difference vectors having smaller distances and to weaken those of difference vectors having larger distances, the plurality of difference vectors are weighted using the calculated distances and added, thereby calculating a grid point correction amount. A weight is calculated like:

$$W = 1/(D^{Kw}) + \text{Offset} \tag{1}$$

where W is a weight, D is a distance between a grid point and reference value, Kw is a weighting coefficient, and Offset is an offset.

The weight is calculated in this way, and "difference vector×weight" is normalized by dividing it by a total value of weights corresponding to the plurality of difference vectors as processing targets. In this manner, a grid point correction amount is calculated based on difference vectors weighted according to their distances, and becomes smaller with increasing distance. Note that a change amount of the weight can be controlled according to a distance using the weighting coefficient and offset. Note that if no difference vector equal to or smaller than the threshold is found, a correction amount for that grid point data is set to be zero.

After the grid point correction amount is determined in this way, the image processing unit 107 reflects the grid point correction amount to the grid point data in step S309. The correction amount calculated in step S308 has three values corresponding to L, a, and b. Since the respective values indicate how much L, a, and b values of a grid point are to be shifted, the image processing unit 107 adds the corresponding correction amount (L, a, and b values) to the L, a, and b values of the grid point, thus reflecting the correction amount, and setting the sum values as corrected grid point data.

After the grid point correction processing in steps S306 to S309 is executed for all grid points of the 3D-LUT, the image processing unit 107 mates interpolation calculations of the corrected grid point data using the L*a*b*→CMY 3D-LUT, thereby calculating new CMY values in step S310, By storing these CMY values as output values for original grid point data, an L*a*b*→CMY 3D-LUT (corrected) is generated.

Note that the L*a*b*→CMY 3D-LUT correction processing is not limited to such specific example, and any other methods may be used. For example, in step S309, the image processing unit 107 may determine a magnitude of a correction amount without directly reflecting the grid point correction amount calculated in step S308 to the grid point correction, and may reflect only a correction amount, whose magnitude is equal to or smaller than a predetermined threshold, to the correction.

4D-LUT Generation Processing (S205)

Figure 4:
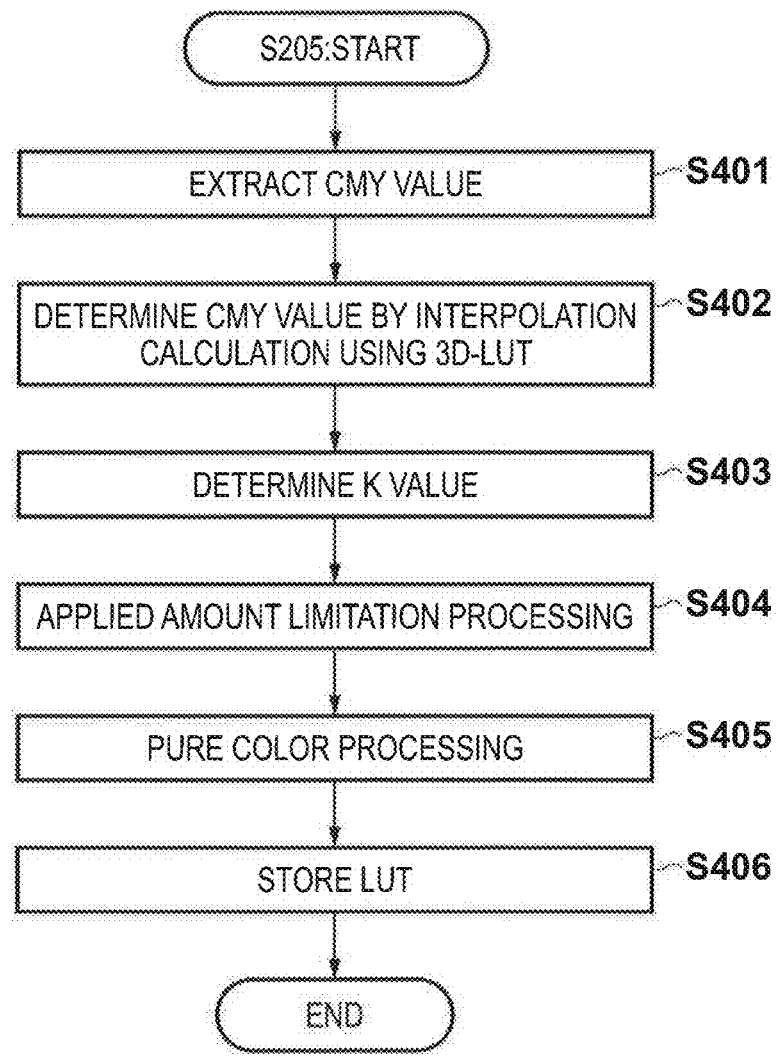
FIG. 4 is a flowchart showing generation processing of a CMYK→CMYK 4D-LUT according to the first embodiment.

The 4D-LUT table generation processing in step S205 will be described in detail below with reference to the flowchart shown in FIG. 4. In step S401, the image processing unit 107 extracts one CMY value from CMYK uniform data, which are generated in advance by uniformly dividing CMYK values. The CMYK uniform data include CMY values as many as the number of grid points of a CMYK→CMYK 4D-LUT to be generated, and data intervals are equal to those of grid points. For example, when the number of grid points of the CMYK→CMYK 4D-LUT is 8×8×8×8=4096, the number of data of the CMYK uniform data is also 4096. Also, when each data is expressed by 8 bits (0 to 255), a data interval is about 36.

In step S402, the image processing unit 107 makes interpolation calculations using the CMY→L*a*b* 3D-LUT as the reference information and the L*a*b*→CMY 3D-LUT (corrected) for the CMY value extracted in step S401, thus determining a corrected CMY value. Note that a CMY→CMY 3D-LUT obtained in this step may be used in place of the 4D-LUT of the 4D-LUT processing unit 1404 in FIG. 14 as the generation goal of this embodiment.

In step S403, the image processing unit 107 extracts a K value corresponding to the CMY value extracted in step S401 from the CMYK uniform data, and generates a CMYK value by combining that K value with the corrected CMY value determined in step S402. Then, in step S404, the image processing unit 107 executes applied amount limitation processing of toners (printing agents) using device information. In this case, the device information expresses toner amounts that can be applied to the printer 106 as numerical values, which amounts will be referred to as "applied amounts" hereinafter. For example, in case of CMYK data, if a maximum value of an applied amount of a unicolor is 100%, signal values of 400% can be set in maximum. However, when a total amount of applicable toners is 300%, the maximum applied amount is 300%. A CMYK value may exceed a prescribed applied amount depending on its combination. Therefore, in such case, the applied amount limitation processing for suppressing the total toner amount to be equal to or lower than an allowance value is implemented by executing, for example, UCR processing which replaces CMY toners by a K toner. A general black expression method includes that using equal amounts of CMY, and that using K alone. An expression using K alone has a lower density than an expression using CMY, but there is a merit of reducing an applied amount.

In step S405, the image processing unit 107 executes pure color processing to generate a CMYK value (corrected). In this case, a pure color is expressed as a unicolor of CMYK or RGBW. Upon execution of correction using the CMYK→CMYK 4D-LUT, it is ideal that if, for example, an input value is pure color data of unicolor C, its output value is also unicolor C. Therefore, in this embodiment, if it is determined with reference to the original CMYK uniform data that data to be processed is originally pure color data, the CMYK value after the applied amount limitation processing in step S404 is modified to pure color data. For example, when CMYK uniform data indicates unicolor C but a CMYK value after the applied amount limitation processing includes an M value, a CMYK value (corrected) is generated by setting this M value to be zero. Then, in step S406, the image processing unit 107 stores the CMYK value (corrected) corresponding to the CMYK uniform data in the CMYK→CMYK 4D-LUT.

Note that the description of this embodiment has been given taking a practical value as the number of grid points of the LUT. Of course, the number of grid points is not limited to such example. As the number of grid points, the CMYK→CMYK 4D-LUT may include different numbers of C and M grid points. Thus, an LUT having a special configuration may be configured.

Chart Data Generation Processing (S208)

Figure 5:
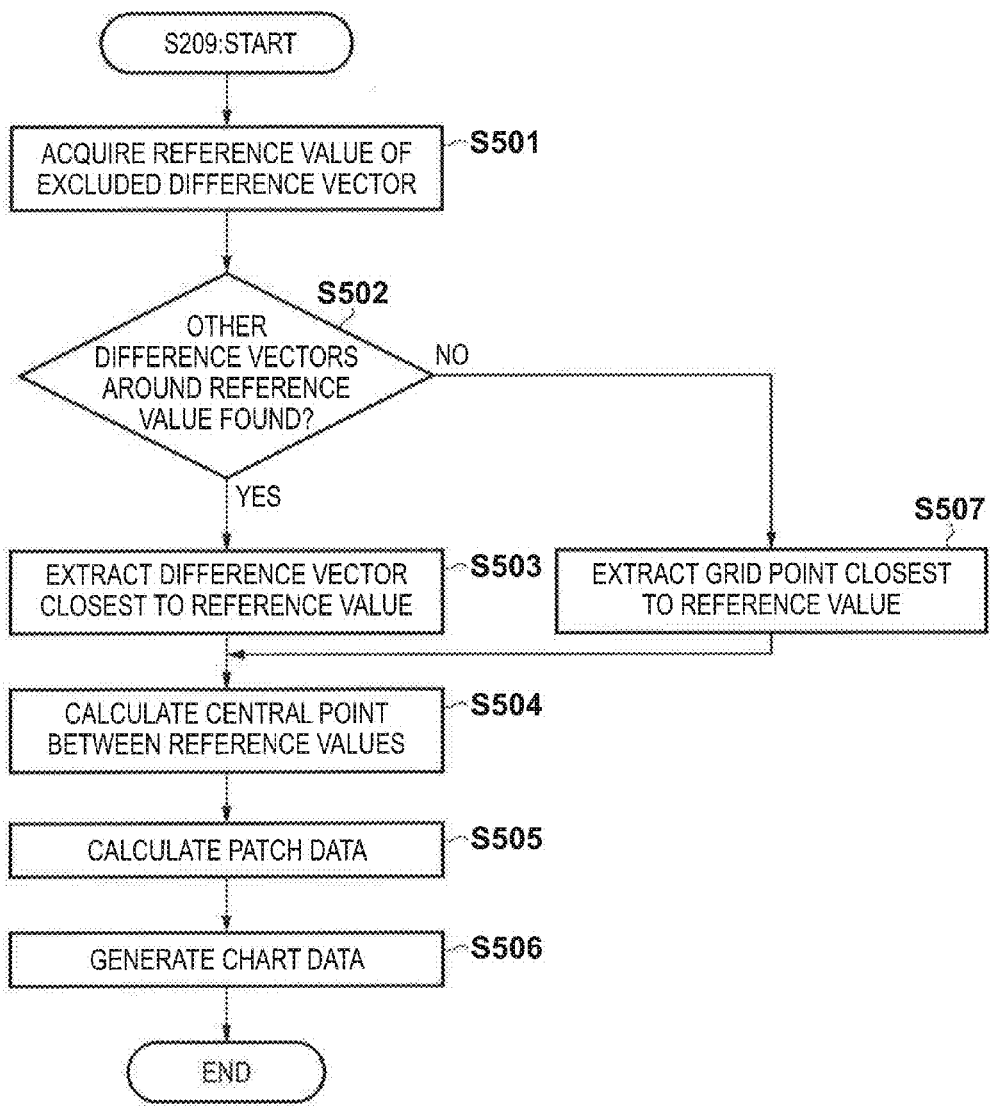
FIG. 5 is a flowchart showing chart data generation processing according to the first embodiment.

The generation processing of new chart data in step S208 will be described in detail below with reference to the flowchart shown in FIG. 5. Note that the processing shown in FIG. 5 is executed for each difference vector excluded in step S305.

In step S501, the controller 105 acquires a reference value corresponding to the excluded difference vector. In step S502, the controller 105 conducts a search to find other difference vectors including non-excluded difference vectors around the acquired reference value. More specifically, this search is conducted to find reference values of other difference vectors around the extracted reference value as in the difference vector search processing in step S307. If other difference vectors are found (YES in step S502), the controller 105 extracts, in step S503, a reference value closest to that extracted in step S501. This search is conducted for all difference vectors as targets. If other difference vectors are not found (NO in step S502), the controller 105 extracts, in step S507, a grid point of the L*a*b*→CMY 3D-LUT closest to the reference value extracted in step S501.

Then, in step S504, the controller 105 calculates a point which equally divides a line segment that couples the reference value extracted in step S501 and the reference value extracted in step S503 or the grid point extracted in step S507, that is, a central point. This central point calculation is made in the L*a*b* color space. For example, letting (L, a, b) be one reference value extracted in step S501, and (L', a', b') be a reference value of the difference vector extracted in step S503, their central point is ((L+L')/2, (a+a')/2, (b+b')/2). Note that when a plurality of reference values or grid points are extracted in step S503 or S507, a central point may be calculated using all the extracted points.

In step S505, the controller 105 executes patch data calculation processing. That is, the controller 105 calculates patch data for the central point calculated in step S504 using the L*a*b*→CMY 3D-LUT (corrected). Finally, the controller 105 executes chart data generation processing in step S506. That is, the controller 105 sequentially places the patch data calculated for respective difference vectors excluded in step S505, thereby generating new chart data. The generated new chart data is held in, for example, a memory (not shown) of the controller 105.

By executing the aforementioned processing for all the difference vectors excluded at the time of mixed color calibrations, new chart data, which approximate patch data corresponding to all the excluded difference vectors according to their surrounding difference vectors (or grid points), can be generated. The new chart data is that according to the conditions of the printer 106 at that time, and more precise correction can be attained by repeating the calibration using the chart data.

Note that the new chart data generation processing is not limited to such specific example, and any other methods may be used as long as new patch data are generated based on excluded difference vectors. For example, on the L*a*b* color space, when the reference value of the excluded difference vector falls outside the L*a*b*→CMY 3D-LUT, new patch data of a closer color may be generated so as to be located inside that LUT. When a calibration is executed using the new chart data including patch data generated in this way, the tonality can be expected to be further improved.

UI Transition

Figure 6:
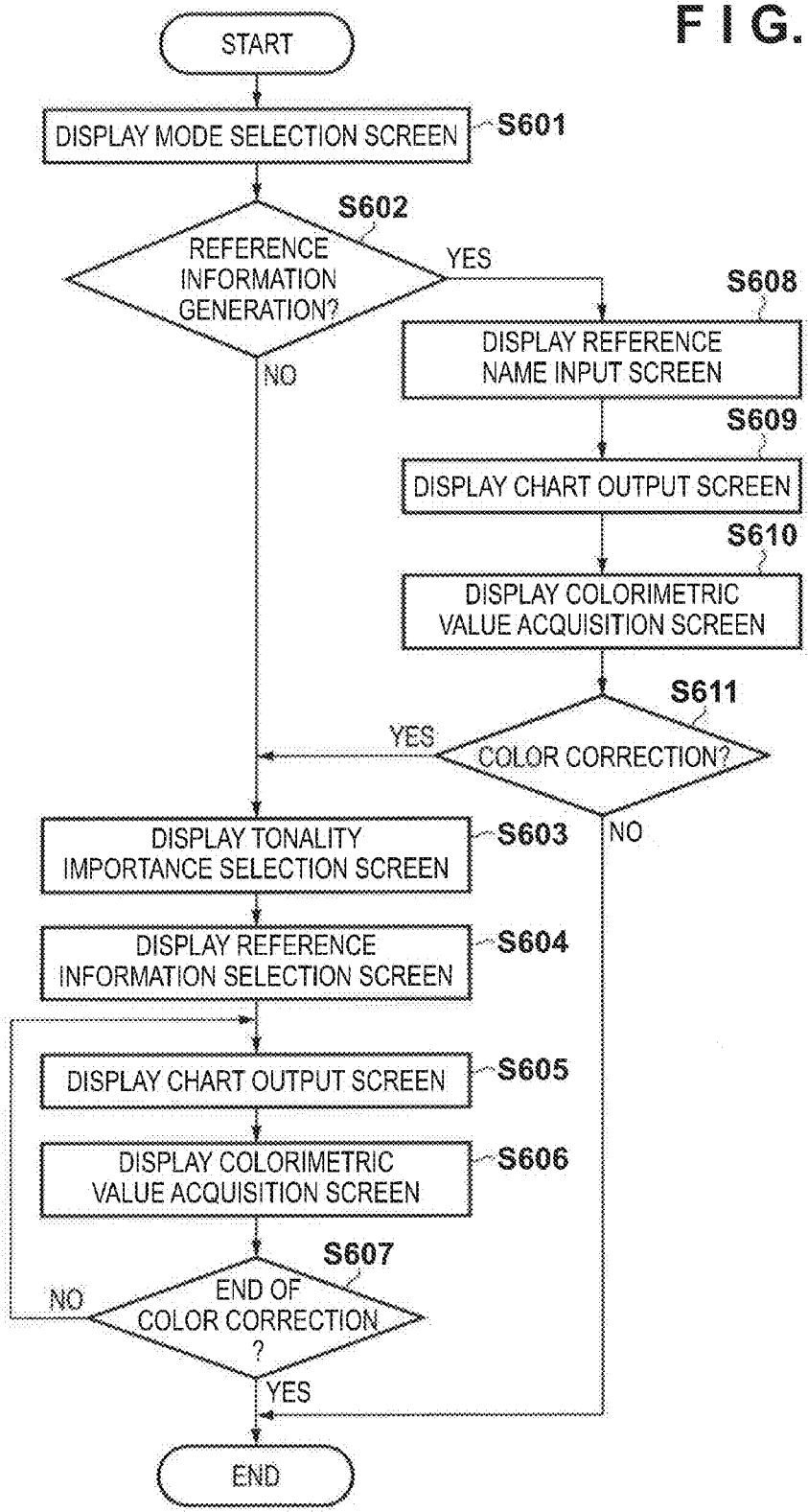
FIG. 6 is a flowchart showing UI transitions according to the first embodiment.

Finally, transitions of display screens in the UI 102 used to accept user instructions will be described below with reference to the flowchart shown in FIG. 6. This UI 102 is displayed under the control of the controller 105 in the MFP 101.

In step S601, the UI 102 displays a mode selection screen. FIG. 7 shows an example of the mode selection screen. On a mode selection screen 701, a "reference information generation" button 702, "color correction parameter generation" button 703, and "reference information generation/color correction parameter generation" button 704 are displayed. The UI 102 can receive an instruction when the user selects processing contents.

The controller 105 determines in step S602 whether or not reference information indicating the current color characteristics of the printer 106 is to be generated. That is, when the user selects the "reference information generation" button 702 or "reference information generation/color correction parameter generation" button 704 on the mode selection screen, the controller 105 judges that the reference information is to be generated (YES), and starts the reference information generation processing shown in FIG. 15.

UI transitions at the time of generation of the reference information in steps S608 to S610 will be described below. In step S608, the controller 105 displays a reference name input screen on the UI 102 to accept a reference name input from the user. In this case, the reference information is color conversion information indicating the color characteristics including mixed colors in the printer 106 at the time of execution of the reference information generation processing, as described above. More specifically, the reference information includes the L*a*b*→CMY LUT (first color conversion table) that describes a correspondence relationship from a device-dependent color space to a device-independent color space, and the CMY→L*a*b* LUT (second color conversion table) that describes a correspondence relationship opposite to the former LUT. This reference information is referred to at the time of the 4D-LUT (third color conversion table) generation processing. Since the user assigns a reference name to the reference information, a plurality of pieces of reference information generated at different times can be identified.

In step S609, the controller 105 displays a message indicating that a chart image required to generate the reference information is output from the printer 106 (output screen display). In response to a timing at which, for example, the user presses an output OK button on the output screen display, the printer 106 outputs a chart image (chart A). This output corresponds to the chart image output processing in step S1501 in FIG. 15 above. After that, the controller 105 displays a colorimetric value acquisition screen in step S610 to prompt the user to acquire colorimetric values of the output chart image using the scanner 103 or the like. According to this colorimetric value acquisition screen, the colorimetric value acquisition processing in step S1502 in FIG. 15 above is executed.

Figure 2:
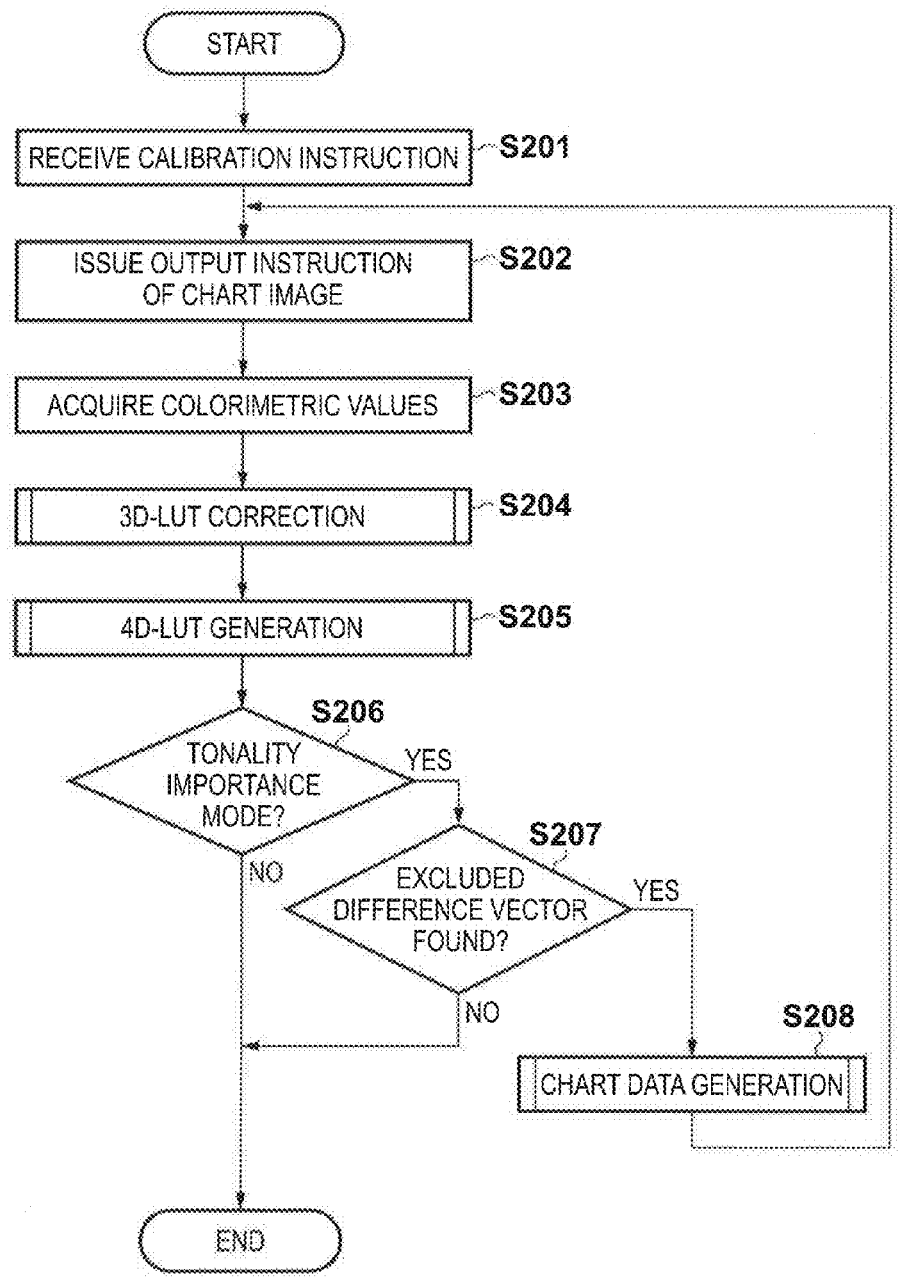
FIG. 2 is a flowchart showing an overview of calibration processing according to the first embodiment.

Then, the controller 105 determines in step S611 whether or not color correction is to be executed after generation of the reference information. That is, if the user selects the "reference information generation/color correction parameter generation" button 704 on the mode selection screen, the controller 105 determines that the calibration processing shown in FIG. 2 is to be executed (YES), and the process advances to step S603. On the other hand, if the user selects the "reference information generation" button 702, the controller 105 determines that the calibration processing is to be skipped (NO), thus ending the processing. On the other hand, if the user selects the "color correction parameter generation" button 703 in step S602, the controller 105 determines that only the calibration processing is to be executed without generating any reference information (NO), and the process advances to step S603.

Figure 13:
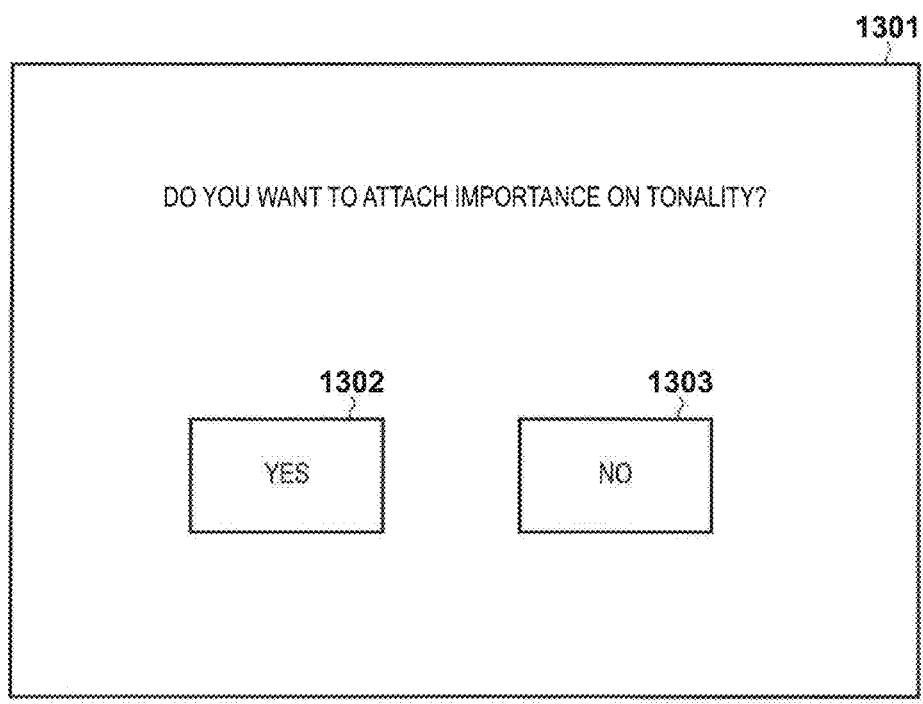
FIG. 13 is a view showing a tonality importance mode selection screen example according to the first embodiment.

UI transitions at the time of execution of the calibration processing (FIG. 2) in step S603 and subsequent steps will be described below. In step S603, the controller 105 displays a tonality importance mode selection screen to prompt the user to select whether or not to execute correction while attaching an importance on the tonality. FIG. 13 shows an example of the tonality importance mode selection screen. On a UI screen 1301, a "YES" button 1302 which indicates that the tonality will be emphasized and a "NO" button 1303 which indicates that the tonality will not be well emphasized, are displayed. When the user selects the "YES" button 1302, the tonality importance mode is set to be OK; when he or she selects the "NO" button 1303, the tonality importance mode is set to be OFF. The tonality importance mode set in this step is held in, tor example, a memory (not shown) in the controller 105.

In step S604, the controller 105 displays a reference information selection screen. FIG. 8 shows an example of the reference information selection screen. As shown in FIG. 8, on a UI screen 801, reference information candidates to be selected are displayed in a list, and the user can select only one of these candidates. Eased on the reference information selected on this screen, the color correction (calibration) is executed. Names displayed in the list correspond to pieces of reference information held in the storage device 104. In this example, "default" 802, "reference information A" 803, "reference information B" 804, and "reference information C" 805 are displayed in the list. The "default" 802 corresponds to default reference information, which is set in advance, and is reference information as representative values of the printer 106 (for example, ideal values used at the time of development). When the user selects this information, a reference chart generated based on representative values at the time of the first calibration is selected (S202), thus executing the color correction to approach colors indicated by the representative values. The "reference information A" 803, "reference information B" 804, and "reference information C" 805 other than the "default" 802 respectively correspond to pieces of reference information which were generated in accordance with user instructions, as shown in FIG. 15. Upon selection of the reference information generated, by the user, a reference chart generated based on this reference information at the time of the first calibration is selected (S202), thus executing the color correction to approach colors of the printer 106 at the generation timing of that reference information.

When the user presses a "next" button 806 after selection of one reference information from the displayed list, the controller 105 displays a message indicating that a chart image for the color correction is output from the printer 106 (output screen display) in step S605. In response to a timing at which, for example, the user presses an output OK button on the output screen display, the printer 106 outputs a chart image (chart B). This output corresponds to the chart image output in step S202 in FIG. 2 above. The chart image (chart B) output in this case is different from the chart image (chart A) which is output in step S609 at the generation timing of the reference information and is obtained by uniformly dividing the CMY color space, since it is based on chart data corresponding to the reference information selected in step S604. After that, the controller 105 displays the colorimetric value acquisition screen to prompt the user to acquire colorimetric values of the output chart image using the scanner 103 or the like in step S606. In accordance with this colorimetric value acquisition screen, the colorimetric value acquisition processing in step S203 in FIG. 2 above is executed.

After completion of the 4D-LUT generation processing (S205) as the calibration processing, the controller 105 determines in step S607 whether or not to end the color correction. This determination processing corresponds to steps S206 and S207 in FIG. 2. That is, if the tonality importance mode is set to be ON using the tonality importance selection screen in step S603, and if difference vectors are excluded in step S305, the controller 105 determines that the color correction is to be continued; otherwise, the processing ends. Since new chart data is generated using the excluded difference vectors in step S208 in FIG. 2, the process returns to step S605, and the UI 102 displays an output screen display of a new chart image.

When the calibration processing is executed again using the new chart image, the L*a*b*→CMY 3D-LUT has already been corrected by the previous calibration processing, and is different from the reference information selected at the start timing of the processing. Therefore, it is effective to generate reference information indicating color characteristics at a current timing every time the calibration processing is executed. That is, if the controller 105 determines in step S607 that the color correction is to be continued, it may generate reference information at the current timing by displaying the UI screens in steps S608 to S610, may store it in the storage device 104, and may then display the chart output screen in step S605.

As described above, according to this embodiment, difference vectors used in the mixed color calibrations are selected, and the calibration processing is repeated using new chart data corresponding to the selected difference vectors. Thus, the calibration precision (for example, tonality) can be improved.

Second Embodiment

The second embodiment according to the present invention will be described hereinafter. The aforementioned first embodiment has exemplified the case in which the difference vector selection processing in step S305 is executed by simple comparison with the threshold. In the second embodiment, more precise selection processing can be executed by comparing a difference vector of interest with its surrounding difference vectors. Note that the system arrangement and the processes other than the difference vector selection processing (S305) in the calibration processing in the second embodiment are the same as those of the aforementioned first embodiment. Therefore, only the difference vector selection processing in the second embodiment will be described below with reference to the flowchart shown in FIG. 10.

In step S1001, the image processing unit 107 extracts a difference vector of interest, and further searches for and extracts those around that difference vector (surrounding difference vectors). In this case, the surrounding difference vectors are an arbitrary number of difference vectors extracted in turn from one closest to the difference vector of interest within a predetermined range from the difference vector of interest on the L*a*b* color space. This search method is the same as that used in step S307 in the aforementioned first embodiment, and is executed based on corresponding reference values.

In step S1002, the image processing unit 107 executes first exclusion determination processing. That is, the image processing unit 107 compares the magnitude of the difference vector of interest with those of the surrounding difference vectors, and determines whether or not the number of difference vectors whose differences exceed a predetermined threshold (second threshold) exceeds a half of the number of compared vectors (the number of surrounding difference vectors). If the number of surrounding difference vectors whose differences exceed the threshold is equal to or larger than the half of the number of compared vectors (YES), since it is determined that the difference vector of interest has an outstanding magnitude compared to the surrounding difference vectors, the difference vector of interest is excluded from those to be referred to at the time of LUT correction amount calculations in step S1003, thus ending the processing.

On the other hand, if the number of surrounding difference vectors whose differences exceed the threshold is not equal to or larger than the half of the number of compared vectors in step S1002 (NO), the image processing unit 107 executes second exclusion determination processing in step S1004. That is, the image processing unit 107 determines whether or not the number of surrounding difference vectors whose angles made with the difference vector of interest on the L*a*b* color space exceed a predetermined threshold (third threshold) exceeds the half of the number of compared vectors (the number of surrounding difference vectors). This angle determination is executed in turn for an L*-a* plane, L*-b* plane, and a*-b* plane in case of the L*a*b* space. For example, letting L1 be the difference vector of interest and L2 be a surrounding difference vector, an angle on the L*-a* plane is calculated by Arccos{<L1, L2>/|L1|×|L2|}, where <L1, L2> an inner product of L1 and L2, and |L1| and |L2| are respectively the lengths of L1 and L2. The angle determination is executed for respective planes, and if an angle exceeds the threshold on at least one plane, it is determined that the angle of the corresponding surrounding difference vector exceeds the threshold. If the number of surrounding difference vectors whose angles exceed the threshold is equal to or larger than the half of the number of compared vectors (YES), it is determined that the difference vector of interest has an outstanding direction compared to the surrounding difference vectors, and the difference vector of interest is excluded from those to be referred to at the time of LUT correction amount calculations in step S1003, thus ending the processing. On the other hand, if the number of surrounding difference vectors whose angles exceed the threshold is not equal to or larger than the half of the number of compared vectors (NO), the processing ends without any processing.

Note that the half (50%) or more of the number of compared vectors is used as the determination conditions in the first exclusion determination (S1002) and second exclusion determination (S1004). However, of course, the present invention is not limited to such specific example. For example, as the determination conditions, a first ratio or higher may be used in the first exclusion determination, and a second ratio or higher may be used in the second exclusion determination. Of course, the first and second ratios may be equal to each other.

As described above, according to the second embodiment, since surrounding difference vectors of a difference vector of interest are taken into consideration upon execution of the selection processing of that difference vector, more precise selection processing can be attained although the processing volume increases. Therefore, the 3D-LUT can be corrected to attach more importance on the tonality.

Note that the second embodiment can be combined with the first embodiment described above. In this case, for example, a difference vector whose magnitude is larger than the first threshold is unconditionally excluded, and whether or not to exclude a difference vector whose magnitude is equal to or less than the first threshold may be determined in consideration of a relationship with surrounding difference vectors as in the second embodiment.

Third Embodiment

Figure 11:
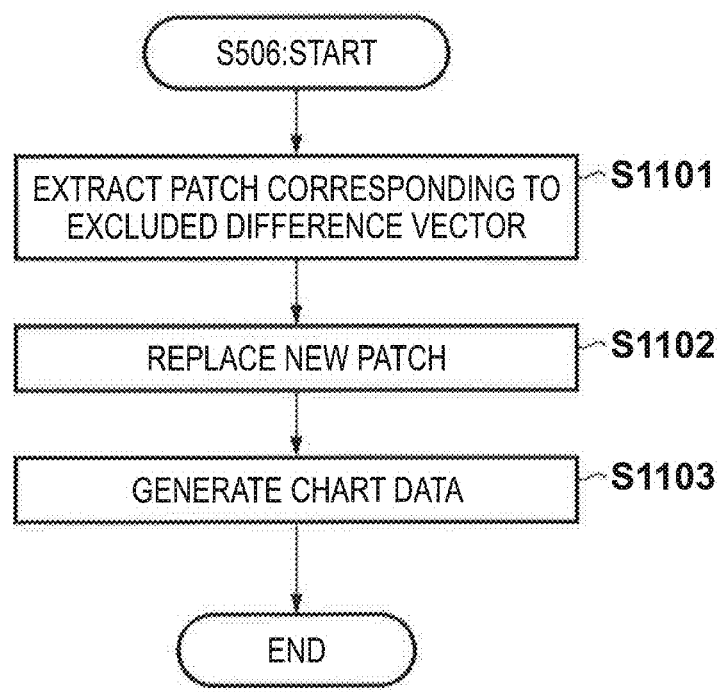
FIG. 11 is a flowchart showing chart data generation processing according to the third embodiment.

The third embodiment according to the present invention will be described hereinafter. The aforementioned first embodiment has exemplified the case in which new chart data is generated by generating new patch data based on excluded difference vectors, and placing them in turn, thereby repeating the calibration processing. The third embodiment features that the generated new chart data is held for the next calibration processing. When a long-term use of new chart data generated at the time of calibration processing is assumed (for example, that new chart data is used for the next calibration processing after an elapse of a considerable period of time), it may be desirable if the new chart data has patches similar to original chart data in order to attain more precise correction. Hence, the third embodiment features that patch data in reference chart data, which is held in advance in the storage device 104 and is to be used for the first calibration, are replaced by newly generated patch data. Note that the system arrangement and the processes other than chart data generation processing (S506) in the third embodiment are the same as those of the first or second embodiment described above. Therefore, only the chart data generation processing in the third embodiment will be described below with reference to the flowchart shown in FIG. 11.

In step S1101, the image processing unit 107 extracts patch data corresponding to an excluded difference vector from chart data loaded from the storage device 104 at the rime of the first calibration in step S202. In step S1102, the image processing unit 101 replaces the extracted patch data by new patch data calculated in step S505 in correspondence with the excluded difference vector. Finally, in step S1103, the image processing unit 107 generates new chart data using intact patch data other than the replaced patch data.

Figure 12:
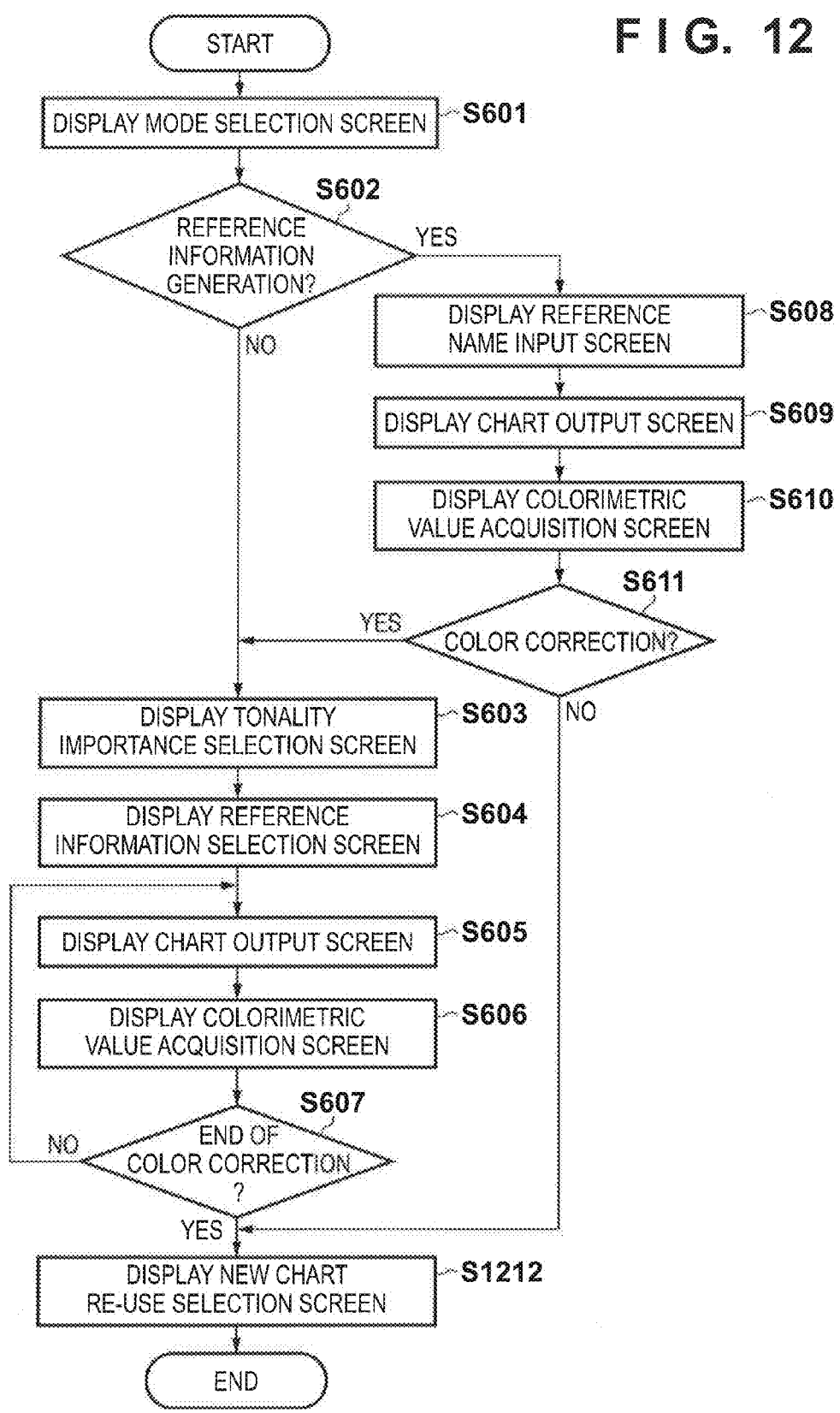
FIG. 12 is a flowchart showing Off transitions according to the third embodiment.

Only differences from the first embodiment of transitions of display screens of the UI 102 in the third embodiment will be described below with reference to the flowchart shown in FIG. 12. In FIG. 12, if it is determined in step S607 that the color correction is to end, the controller 105 displays a new chart re-use selection screen which prompts the user to select whether or not to re-use new chart data in step S1212. If new chart data is to be re-used, the controller 105 stores the new chart data generated by reflecting new patch data, as described above, in the storage device 104 in association with default reference information. That is, the default reference chart data is replaced by the new chart data. Thus, at the next execution timing of the calibration processing, when the user selects the "default" 802 on the reference information selection screen shown in FIG. 8 in step S604, the replaced reference chart data is referred to.

As described above, according to the third embodiment, newly generated patch data are reflected to the reference chart data used at that time, and are held as the reference chart data corresponding to default information. As a result, the reference chart data corresponding to the default information is updated to indicate the latest color characteristics of the printer 106. Therefore, when the next calibration processing is executed after an elapse of a considerably long period of time, the reference chart data corresponding to the default information is used, thus attaining more efficient, more precise calibrations.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-031263, filed Feb. 16, 2011 which is hereby incorporated by reference herein in its entirety.

What is claimed is:

1. An image processing apparatus comprising:
 a holding unit configured to hold a first color conversion table and a second color conversion table, and chart data including a plurality of patch data on a device-independent color space, which are generated using the first color conversion table and the second color conversion table, wherein the first color conversion table specifies color conversion characteristics from the device-independent color space to a device-dependent color space in an output device, and the second color conversion table specifies color conversion characteristics from the device-dependent color space to the device-independent color space;

an acquisition unit configured to acquire reference values which are values of the respective patch data in the chart data, and colorimetric values of respective patches on a chart image output by the output device using the chart data;

a selection unit configured to select difference vectors to be used in correction processing of the first color conversion table from difference vectors between the reference values and the corresponding colorimetric values;

a table correction unit configured to correct output values for respective grid points of the first color conversion table using the selected difference vectors;

a table generation unit configured to set conversion results of data which represent grid points of a third color conversion table as output values for the grid points, wherein the conversion results are obtained by performing conversion using the second color conversion table and the first color conversion table which is corrected by said table correction unit, and wherein the third color conversion table is used to correct image data to be output by the output device on the device-dependent color space; and a chart data generation unit configured to generate new chart data by calculating new patch data corresponding to a difference vector which is not selected by said selection unit, using difference vectors or grid points around that difference vector and the first color conversion table corrected by said table correction unit, wherein said acquisition unit, said table correction unit, and said table generation unit are configured to execute processing again using the new chart data generated by said chart data generation unit.

2. The apparatus according to claim 1, wherein said selection unit is further configured to select the difference vectors to be used in correction processing of the first color conversion table, which remain when difference vectors whose magnitudes exceed a first threshold are excluded from all the difference vectors.

3. The apparatus according to claim 1, wherein said selection unit comprises:
a surrounding difference search unit configured to search for, regarding an arbitrary difference vector of interest of the difference vectors, difference vectors falling within a predetermined range from the difference vector of interest on the device-independent color space, and to extract those difference vectors as surrounding difference vectors;
a first exclusion unit configured to exclude the difference vector of interest when the number of surrounding difference vectors, whose differences in magnitude from the difference vector of interest exceed a second threshold, is not less than a first ratio; and
a second exclusion unit configured to exclude the difference vector of interest when the number of surrounding difference vectors, whose angles made with the difference vector of interest exceeds a third threshold, is not less than a second ratio, and
said selection unit is further configured to select difference vectors to be used in correction processing of the first color conversion table, which remain without being excluded by said first exclusion unit and said second exclusion unit from all the difference vectors.

4. The apparatus according to claim 1, wherein said table correction unit comprises:
a distance calculation unit configured to calculate distances between respective grid points on the device-independent color space in the first color conversion table and the reference values corresponding to the difference vectors;
an addition unit configured to calculate sum values of the difference vectors corresponding to the reference values and data which represent the grid points, for the difference vectors whose distances do not exceed a fourth threshold; and
a correction unit configured to calculate values on the device-dependent color space corresponding to the sum values using the first color conversion table, and to set the calculated values as output values for the grid points.

5. The apparatus according to claim 1, wherein said chart data generation unit comprises:
a reference value acquisition unit configured to acquire the reference value corresponding a difference vector which is not selected by said selection unit;
an extraction unit configured to extract a difference vector or a grid point, which is closest to the reference value acquired by said reference value acquisition unit, from sill the difference vectors and grid points of the first color conversion table;
a central point calculation unit configured to calculate a central point of a line segment which couples the reference value acquired by said reference value acquisition unit and the reference value corresponding to the difference vector or the grid point extracted by said extraction unit;
a patch data calculation unit configured to calculate patch data corresponding to the central point using the first color conversion table corrected by said table correction unit; and
a patch data placement unit configured to generate the new chart data by placing the calculated patch data for each reference value acquired by said reference value acquisition unit.

6. The apparatus according to claim 5, wherein said patch data placement unit is further configured to generate the new chart data by placing only patch data calculated by said patch data calculation unit.

7. The apparatus according to claim 5, wherein said patch data placement unit is further configured to generate the new chart data by replacing patch data corresponding to a difference vector which is not selected by said selection unit in the chart data held in said holding unit by patch data calculated by said patch data calculation unit.

8. The apparatus according to claim 1, wherein the device-dependent color space is a at least three-dimensional color space corresponding to at least three colors including cyan, magenta, and yellow.

9. The apparatus according to claim 8, wherein the third color conversion table is a table which represents a color conversion relationship of the image data on a four-dimensional color space corresponding to four colors, wherein the four colors include the at least three colors and black.

10. An image processing method comprising the steps of:
holding a first color conversion table and a second, color conversion table, and chart data including a plurality of patch data on a device-independent color space, which are generated using the first color conversion table and the second color conversion table, wherein the first color conversion table specifies color conversion characteristics from the device-independent color space to a device-dependent color space in an output device, and the second color conversion table specifies color conversion characteristics from the device-dependent color space to the device-independent color space;

acquiring reference values which are values of the respective patch data in the chart data, and colorimetric values of respective patches on a chart image output by the output device using the chart data;

selecting difference vectors to be used in correction processing of the first color conversion table from difference vectors between the reference values and the corresponding colorimetric values;

correcting output values for respective grid points of the first color conversion table using the selected difference vectors;

setting conversion results of data which represent grid points of a third color conversion table as output values for the grid points, wherein the conversion results are obtained by performing conversion using the second color conversion table and the first color conversion table which is corrected in said correcting step, and wherein the third color conversion table is used to correct image data to be output by the output device on the device-dependent color space; and generating new chart data by calculating new patch data corresponding to a difference vector which is not selected in said selecting step, using difference vectors or grid points around that difference vector and the first color conversion table corrected in said correcting step, wherein said acquiring step, said correcting step, and said setting step are performed again using the new chart data generated in said generating step.

11. A storage medium storing a program for controlling a computer apparatus to function as respective units of an image processing apparatus of claim 1 when the program is executed by the computer apparatus.

12. An image processing apparatus comprising:

a holding unit configured to hold a first color conversion table and a second color conversion table, and chart data including a plurality of patch data on a device-independent color space, which are generated using the first color conversion table and the second color conversion table, wherein the first color conversion table specifies color conversion characteristics from the device-independent color space to a device-dependent color space in an output device, and the second color conversion table specifies color conversion characteristics from the device-dependent color space to the device-independent color space;

an acquisition unit configured to acquire reference values which are values of the respective patch data in the chart data, and colorimetric values of respective patches on a chart image output by the output device using the chart data;

a selection unit configured to select difference vectors to be used in correction processing of the first color conversion table from difference vectors between the reference values and the corresponding colorimetric values;

a table correction unit configured to correct output values for respective grid points of the first color conversion table using the selected difference vectors; and a table generation unit configured to set conversion results of data which represent grid points of a third color conversion table as output values for the grid points, wherein the conversion results are obtained by performing conversion using the second color conversion table and the first color conversion table which is corrected by said table correction unit;

wherein said selection unit is further configured to select the difference vectors to be used in correction processing of the first color conversion table, which remain when difference vectors whose magnitudes exceed a first threshold are excluded from all the difference vectors.

* * * * *